United States Patent
Randel et al.

(10) Patent No.: US 9,042,721 B2
(45) Date of Patent: May 26, 2015

(54) STOCHASTIC REFLECTOMETER

(75) Inventors: Sebastian Randel, Aberdeen, NJ (US); Jeffrey H. Sinsky, Marlboro, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 102 days.

(21) Appl. No.: 13/557,843

(22) Filed: Jul. 25, 2012

(65) Prior Publication Data
US 2014/0029932 A1 Jan. 30, 2014

(51) Int. Cl.
*H04B 10/071* (2013.01)
*G01M 11/00* (2006.01)

(52) U.S. Cl.
CPC ......... *G01M 11/3118* (2013.01); *H04B 10/071* (2013.01)

(58) Field of Classification Search
USPC ........................... 398/10, 13, 16, 17, 20–22, 9
See application file for complete search history.

(56) References Cited

U.S. PATENT DOCUMENTS

| | | | |
|---|---|---|---|
| 5,621,518 A * | 4/1997 | Beller .......................... 356/73.1 |
| 2006/0081779 A1 * | 4/2006 | Yeo et al. .................... 250/338.1 |
| 2007/0274731 A1 * | 11/2007 | Boffi et al. ..................... 398/188 |
| 2008/0199185 A1 * | 8/2008 | Miller et al. ................... 398/139 |
| 2009/0310665 A1 * | 12/2009 | Agazzi et al. ................. 375/229 |
| 2010/0150553 A1 * | 6/2010 | Kang et al. ....................... 398/43 |
| 2012/0189300 A1 * | 7/2012 | Lindsay et al. .................. 398/26 |
| 2012/0243863 A1 * | 9/2012 | Zhao et al. ....................... 398/16 |
| 2013/0202287 A1 * | 8/2013 | Joffe ............................... 398/13 |

* cited by examiner

*Primary Examiner* — David Payne
*Assistant Examiner* — Casey Kretzer
(74) *Attorney, Agent, or Firm* — Mendelsohn, Drucker & Dunleavy, P.C.; Yuri Gruzdkov

(57) ABSTRACT

Disclosed herein are various embodiments of a time-domain reflectometer having a transmitter configured to apply, to a system under test (SUT), an intensity-modulated probe signal generated based on a periodic pseudo-random bit sequence. The reflectometer further has a receiver configured to receive, back from the SUT, a reflected signal corresponding to the probe signal. The receiver converts the received reflected signal into a binary bit sequence using a relatively simple slicer circuit, and without the use of complex analog circuits and/or multi-bit analog-to-digital converters. The binary bit sequence is then compared with the original pseudo-random bit sequence to obtain a measure of the impulse response of the SUT. In some embodiments, the reflectometer has a controllable noise generator that can be used, e.g., to optimize the obtained measure for the detection of multiple SUT defects having significantly differing reflection characteristics.

18 Claims, 3 Drawing Sheets

100

200

STOCHASTIC REFLECTOMETER

BACKGROUND

1. Field

The present invention generally relates to apparatus and methods that use reflectometry.

2. Description of the Related Art

This section introduces aspects that may help facilitate a better understanding of the invention(s). Accordingly, the statements of this section are to be read in this light and are not to be understood as admissions about what is in the prior art or what is not in the prior art.

A time-domain (TD) reflectometer is an instrument that is designed to characterize the impulse response of an object, device, or system under test. Depending on the type of the probe waves, a TD reflectometer can be classified as an acoustic reflectometer, a radio-frequency reflectometer, an optical reflectometer, etc. Exemplary applications that rely on TD reflectometers include but are not limited to fault diagnostics for coaxial cables and optical channels, integrity tests for printed circuit boards, waveguides, and wiring systems, detection of leaks in ducts and pipelines, and medical diagnostics of bodily cavities, such as the respiratory system and the ears, nose, and throat.

For example, a representative optical TD reflectometer operates by firing an optical pulse into an optical line under test and then recording one or more reflections of this pulse from one or more defects (if any) along the length of the optical line. More specifically, the optical pulse may undergoes partial reflection and partial transmission at each defect, thereby creating reflected optical signals. These reflected optical signals may travel back to the reflectometer to be detected and correlated with the original optical pulse to determine the location and strength of each defect.

SUMMARY OF SOME SPECIFIC EMBODIMENTS

Disclosed herein are various embodiments of an optical time-domain (TD) reflectometer having an optical transmitter configured to apply, to a system under test (SUT), an intensity-modulated probe signal generated based on a periodic random or periodic pseudo-random bit sequence. The reflectometer further has an optical receiver configured to receive, back from the system under test, a reflected optical signal corresponding to the probe signal. The receiver converts the received reflected signal into a binary bit sequence using a relatively simple slicer circuit, and without the use of complex analog circuits and/or multi-bit analog-to-digital converters. The binary bit sequence is then compared with the original random or pseudo-random bit sequence to obtain a measure of the impulse response of the SUT. In some embodiments, the reflectometer has a controllable noise generator that can be used, e.g., to optimize the obtained measure for the detection of multiple SUT defects having significantly differing light-reflection characteristics.

According to one embodiment, provided is an apparatus comprising a transmitter configured to generate a modulated probe signal based on a first bit sequence and to apply said modulated probe signal to a system under test; and a receiver configured to receive a reflected signal corresponding to the modulated probe signal back from the system under test and to convert the reflected signal into a second bit sequence. The receiver comprises a slicer circuit configured to compare a signal sample corresponding to the reflected signal with a threshold level and to generate a respective bit of the second bit sequence based on said comparison.

In some embodiments of the above apparatus, the slicer circuit is a single-bit analog-to-digital converter.

In some embodiments of any of the above apparatus, the apparatus is configured to generate the first and second bit sequences so that: the first bit sequence is periodic, wherein each period has a plurality of time slots, with each time slot having a respective single bit of the first bit sequence; and the second bit sequence has a plurality of time slots, with each time slot having a respective single bit of the second bit sequence.

In some embodiments of any of the above apparatus, a period of the first bit sequence carries a random or pseudo-random bit sequence.

In some embodiments of any of the above apparatus, the second bit sequence represents an impulse response of the system under test.

In some embodiments of any of the above apparatus, the transmitter comprises: an optical source configured to generate the modulated probe signal, wherein the modulated probe signal is an intensity-modulated optical signal; and a drive circuit configured to drive the optical source based on the first bit sequence having first and second binary values in a manner that causes the optical source to generate an optical pulse for the intensity-modulated optical signal in response to each first binary value in the first bit sequence, and not to generate an optical pulse for the intensity-modulated optical signal in response to each second binary value in the first bit sequence.

In some embodiments of any of the above apparatus, the reflected signal is an optical signal; and the receiver further comprises: an optical detector configured to convert the received reflected signal into a corresponding first electrical signal; an amplifier configured to convert the first electrical signal into an amplified electrical signal; a coupling capacitor configured to block a dc component of the amplified electrical signal to generate a second electrical signal; and a signal sampler configured to sample the second electrical signal to generate the signal samples for the slicer circuit.

In some embodiments of any of the above apparatus, the apparatus further comprises: a noise generator configured to inject noise into an incoming electrical signal path; and a controller configured to control a level of the noise injected by the noise generator into the incoming electrical signal path.

In some embodiments of any of the above apparatus, the apparatus further comprises a digital circuit configured to compare the first bit sequence with each of a plurality of variously delayed copies of the second bit sequence to generate a measure of an impulse response of the system under test.

In some embodiments of any of the above apparatus, the digital circuit comprises: a series of delay elements configured to incrementally delay the second bit sequence with respect to the first bit sequence to generate the plurality of the variously delayed copies of the second bit sequence; a plurality of XNOR gates, each configured to receive (i) a respective copy of the first bit sequence and (ii) a respective one of the plurality of the variously delayed copies of the second bit sequence from a respective one of the delay elements; a plurality of counters, each coupled to an output of a respective one of the plurality of the XNOR gates and configured to count a number of first binary values generated by the XNOR gate over a fixed time interval, wherein a set of said counted numbers generated by the plurality of said counters is a measure of the impulse response of the system under test.

In some embodiments of any of the above apparatus, the fixed time interval has a duration that is an integer multiple of a period of the first bit sequence.

In some embodiments of any of the above apparatus, the apparatus further comprises at least one of: a memory configured to store the generated measure; and the system under test.

In some embodiments of any of the above apparatus, the apparatus further comprises a digital processor configured to retrieve the measure from the memory and to process the retrieved measure to determine whether one or more defects exist in the system under test.

In some embodiments of any of the above apparatus, if the digital processor detects a defect in the system under test, then the digital processor processes the retrieved measure to determine a reflection coefficient corresponding to the defect and a travel time of the probe signal to the defect.

In some embodiments of any of the above apparatus, if the digital processor detects first and second defects in the system under test, then the digital processor processes the retrieved measure to determine a respective reflection coefficient corresponding to each of the first and second defects and a respective travel time of the probe signal to each of the first and second defects.

In some embodiments of any of the above apparatus, the apparatus further comprises a digital circuit that includes: a series of delay elements configured to incrementally delay the first bit sequence with respect to the second bit sequence to generate a plurality of the variously delayed copies of the first bit sequence; a plurality of XNOR gates, each configured to receive (i) a respective copy of the second bit sequence and (ii) a respective one of the plurality of the variously delayed copies of the first bit sequence from a respective one of the delay elements; a plurality of counters, each coupled to an output of a respective one of the plurality of the XNOR gates and configured to count a number of first binary values generated by the XNOR gate over a fixed time interval, wherein a set of said counted numbers generated by the plurality of said counters is a measure of the impulse response of the system under test.

In some embodiments of any of the above apparatus, the apparatus comprises an optical reflectometer, wherein: the transmitter is an optical transmitter configured to generate the modulated probe signal so that it is an optical signal; and the receiver is an optical receiver configured to receive a reflected optical signal corresponding to the optical modulated probe signal generated by the optical transmitter.

In some embodiments of any of the above apparatus, the apparatus comprises an electrical radio-frequency reflectometer, wherein: the transmitter is an electrical radio-frequency transmitter configured to generate the modulated probe signal so that it is an electrical signal; and the receiver is an electrical radio-frequency receiver configured to receive a reflected electrical radio-frequency signal corresponding to the electrical radio-frequency modulated probe signal generated by the electrical radio-frequency transmitter.

In some embodiments of any of the above apparatus, the apparatus comprises an acoustic reflectometer, wherein: the transmitter comprises an acoustic transducer configured to generate the modulated probe signal so that it is an acoustic signal; and the receiver comprises an acoustic microphone configured to receive a reflected acoustic signal corresponding to the acoustic modulated probe signal generated by the acoustic transducer.

According to another embodiment, provided is a method of probing a system under test, the method comprising: generating a modulated probe signal based on a first bit sequence; applying said modulated probe signal to the system under test; receiving a reflected signal corresponding to the modulated probe signal back from the system under test; and using a slicer circuit to (i) compare a signal sample corresponding to the reflected signal with a threshold level and (ii) generate a respective bit of a second bit sequence based on said comparison.

BRIEF DESCRIPTION OF THE DRAWINGS

Other aspects, features, and benefits of various embodiments of the invention will become more fully apparent, by way of example, from the following detailed description and the accompanying drawings, in which.

DETAILED DESCRIPTION

In one representative implementation, an optical time-domain (TD) reflectometer may use relatively complex analog circuitry for cross-correlating an excitation pulse and a corresponding reflected signal. In another representative implementation, an optical TD reflectometer may use an A/D (analog-to-digital) converter having a relatively high digital-signal resolution and/or a relatively high sampling rate to enable appropriate processing of cross-correlation signals in the digital domain. Disadvantageously, both of these implementations can be relatively technically complex and/or expensive, which may severely limit deployment of the corresponding devices in the field. It is therefore desirable to have a robust and low-cost optical TD reflectometer suitable for various field applications.

Figure 1:
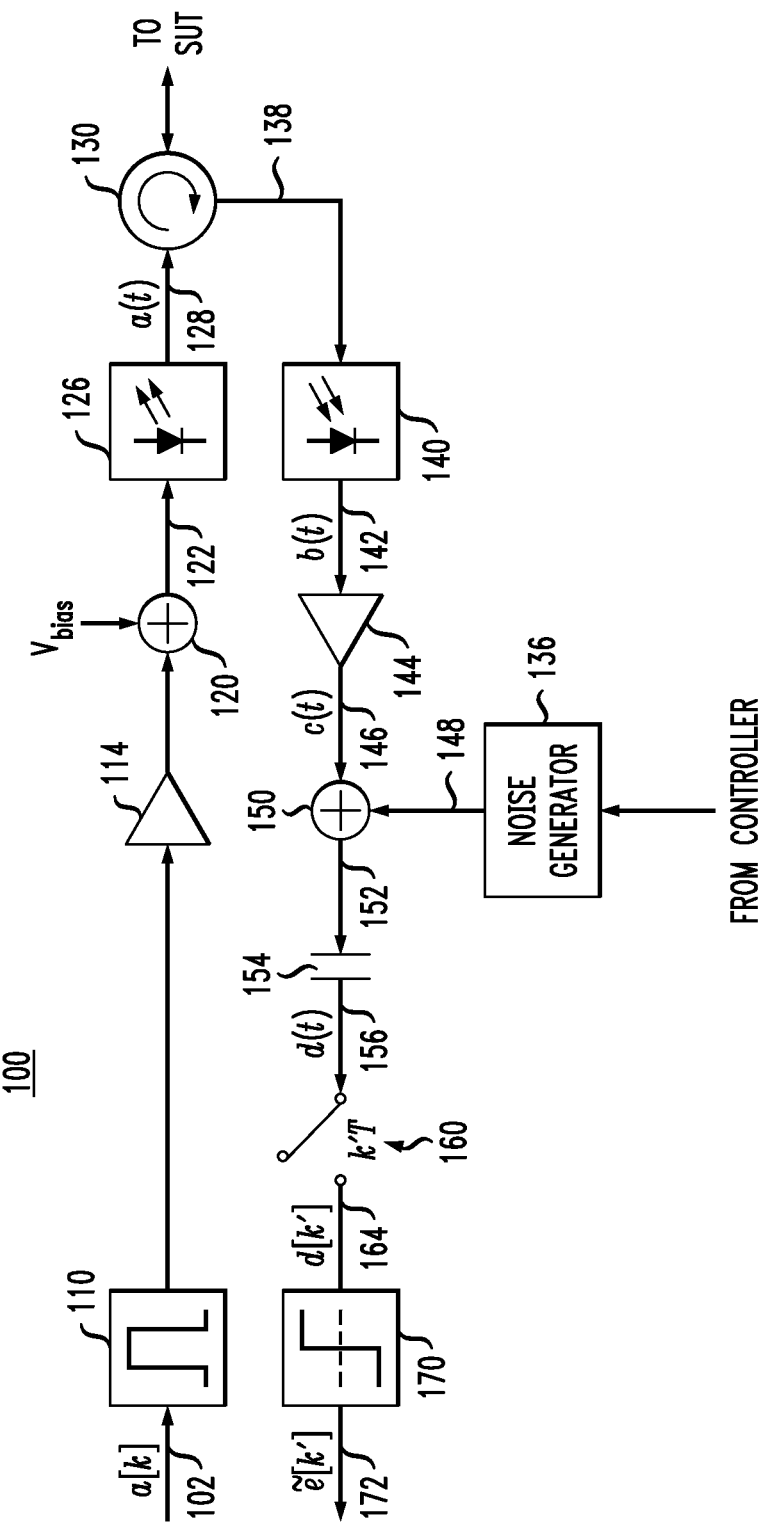
FIG. 1 shows a block diagram of an optical time-domain (TD) reflectometer according to one embodiment of the disclosure.

FIG. 1 shows a block diagram illustrating an optical TD reflectometer 100 according to one embodiment of the disclosure. Reflectometer 100 is illustratively shown as being configured to generate a measure of an impulse response of a system under test (SUT). As used herein, the term "impulse response" refers to an echo signal produced by the object, line, channel, device, or system (all of which are examples of the SUT) under test in response to a single excitation impulse. An ideal excitation impulse produces an ideal impulse response and is described by the Dirac delta function for continuous-time systems or by the Kronecker delta function for discrete-time systems. Since the excitation waveforms that are generated in practice are not ideal impulses, the impulse response measured by a reflectometer, such as reflectometer 100, is an approximation of the ideal impulse response. The term "impulse response" should be construed to encompass the reflected impulse response or the transmitted impulse response, or both. In the context of TD reflectometers, the measured impulse response is usually a reflected impulse response. However, based on the present disclosure, a person of ordinary skill in the relevant arts would easily be able to convert the measured reflected impulse response into a corresponding transmitted impulse response, with the latter being the impulse response that would have been measured at the remote end of the SUT.

Reflectometer 100 has an optical circulator 130 or another 3-port optical coupler that is configured to (i) direct an optical probe signal 128 generated by a light source (e.g., a laser) 126 into the SUT and (ii) direct a reflected optical signal 138 from the SUT to an optical detector (e.g., a photodiode) 140. Light source 126 generates intensity-modulated probe signal 128 while being driven by a drive signal 122 that is generated, based on an input data signal 102, by a pulse shaper 110, an optional amplifier 114, and a bias circuit 120. Optical detector 140 converts reflected optical signal 138 into a corresponding photocurrent 142, which is then converted into an output data signal 172, e.g., as further described below. Output data signal 172 is directed for further processing to external circuitry, such as a digital signal processor (not explicitly shown in FIG. 1; see, e.g., FIG. 2), based on which processing an impulse response of the SUT can be determined.

In one exemplary configuration, input data signal 102 is a periodic signal a[k], each period of which carries pseudo-random bit sequence {a_0[k]}, defined by Eqs. (1a)-(1b) as follows:

$$a[k] \in [-1, 1] \quad (1a)$$

$$a[k] = a_0[\mathrm{mod}(k,N)] \quad (1b)$$

where k is an index that can take any integer value from $-\infty$ to $+\infty$, different values of which designate different time slots; and N is the number of bits in a period of input data signal 102. Note that Eq. (1b) expresses the periodicity of signal a[k]. Each period $a_0$ of input data signal 102 has $N_4$ elements whose value is $-1$, and $N_1$ elements whose value is 1, where $N_{-1} + N_1 = N$. Each element occupies a corresponding time slot of duration T.

In one embodiment, pseudo-random bit sequence {a_0[k]} can be a maximum-length sequence (MLS). More specifically, an MLS sequence consists of an apparently random (but deterministic) sequence of ones and minus ones arranged in such a manner that the resulting signal has a substantially flat frequency spectrum in the frequency range between the zero (dc) frequency and the Nyquist frequency. An MLS sequence has $N = 2^m - 1$ bits and can be generated as known in the art, e.g., using a recursion relation corresponding to a primitive polynomial. The value of m affects the acquisition speed of reflectometer 100, meaning that the reflectometer can measure no more than one impulse response in a time period corresponding to the full MLS length. In an exemplary configuration, m=7. Other values of m can also be used. In general, the larger the m value, the longer the distance into the SUT that can be tested in an unambiguous manner. Therefore, the m value is preferably selected to strike an acceptable compromise between the acquisition speed and the desired range of distances to be probed in the SUT.

In one configuration, pulse shaper 110, amplifier 114, bias circuit 120, and optical source 126 may operate to convert input data signal 102 into probe signal 128 in accordance with Eq. (2):

$$a(t) = \frac{1}{2} P_0 \sum_{k=-\infty}^{\infty} (a[k] + 1) p(t - kT) \quad (2)$$

where t is time; a(t) is the intensity of probe signal 128; $P_0$ is the peak optical power generated by optical source 126; p(t) is the normalized optical-pulse envelope in probe signal 128; and T is the symbol period (time-slot duration) in probe signal 128. This result can be achieved, for example, as follows. Pulse shaper 110 operates to output (i) an electrical pulse for each "1" in bit sequence {a[k]} and (ii) no pulse for each "-1" in bit sequence {a[k]}. Amplifier 114 appropriately amplifies the electrical pulses received from pulse shaper 110. Bias circuit 120 adds dc voltage $V_{bias}$ to appropriately shift the baseline of the train of amplified electrical pulses generated by amplifier 114, thereby generating drive signal 122. The value of $V_{bias}$ is selected so as to cause optical source 126 to output substantially no light at the baseline level of drive signal 122 and to output optical power $P_0$ at the maximum of each pulse in the drive signal.

An alternative configuration, in which only partial light extinction is achieved between the pulses at the baseline level of drive signal 122, is also possible. In this case, the intensity a(t) of probe signal 128 can be described by Eq. (3):

$$a(t) = (1 - \eta) P_0 + \frac{1}{2} \eta P_0 \sum_{k=-\infty}^{\infty} (a[k] + 1) p(t - kT) \quad (3)$$

where $\eta$ is the intensity-modulation index of probe signal 128. Note that, for $\eta=1$, Eq. (3) transforms into Eq. (2).

Suppose now that the SUT has L locations, each of which causes a partial reflection of the corresponding optical signal propagating through the SUT. Then photocurrent 142 generated by optical detector 140 can be approximately expressed by Eq. (4):

$$b(t) = R \sum_{l=0}^{L-1} \alpha_l a(t - \tau_l) \quad (4)$$

where b(t) is the magnitude of electrical signal 142; R is the light-to-current conversion coefficient of optical detector 140; $\alpha_l$ is the reflection coefficient corresponding to the l-th reflection location in the SUT; and $\tau_l$ is the signal's round-trip time to the l-th reflection location.

In a representative embodiment, photocurrent 142 is converted into output data signal 172, for example, as follows. An electronic transimpedance amplifier 144 converts photocurrent 142 into an electrical (voltage) signal 146. An optional signal adder 150 converts electrical signal 146 into an electrical signal 152 by adding to it a noise signal 148 generated by a controllable (e.g., white Gaussian) noise generator 136. A coupling capacitor 154 blocks the dc component of electrical signal 152, thereby converting it into an electrical signal 156. A signal sampler 160 samples electrical signal 156 once per symbol period T (also see Eq. (2)), thereby generating a corresponding sequence 164 of analog signal samples. A slicer circuit 170 compares each signal sample of sequence 164 with a specified threshold level (e.g., zero) and, based on the comparison, generates a corresponding bit for output data signal 172. More specifically, if the signal sample is above the threshold level, then slicer circuit 170 outputs a "1" bit in the corresponding time slot of output data signal 172. Alternatively, if the signal sample is below the threshold level, then slicer circuit 170 outputs a "-1" bit in the corresponding time slot of output data signal 172.

Similar to bit sequence {a[k]}, bit sequence {ẽ[k']} carried by output data signal 172 is a binary data stream consisting of "ones" and "minus ones." As a result, these two bit sequences can be compared and/or cross-correlated to determine the impulse response of the SUT. Thus, reflectometer 100 is able to locate defects in the SUT using the statistics of binary bit sequences. Advantageously, the required bit-sequence processing can be performed using low-cost digital circuitry, such as an inexpensive application-specific integrated circuit (ASIC) or a relatively simple field-programmable gate array (FPGA) (neither explicitly shown in FIG. 1). Reflectometer 100 (as shown in FIG. 1) typically does not employ any costly or complex analog circuits or multi-bit A/D converters. These features of reflectometer 100 may give it a significant competitive edge over other functionally comparable devices.

Reflectometer 100 can be referred to as a stochastic reflectometer for two reasons. A first reason is that reflectometer 100 uses a pseudo-random bit sequence $\{a[k]\}$ for the generation of probe signal 128. A second reason is that reflectometer 100 may use noise characteristics affecting bit sequence $\{\tilde{e}[k']\}$ in the determination of the severity of defects in the SUT, e.g., as further described below.

In general, noise is inherently present in any electro-optical system, such as reflectometer 100 coupled to a SUT. If fragment $\{\tilde{\epsilon}[k']\}$ of bit sequence $\{\tilde{e}[k']\}$ corresponds to bit sequence $\{a[k]\}$, then, the presence of noise may cause the fragment $\{\tilde{\epsilon}[k']\}$ to be different from bit sequence $\{a[k]\}$. The difference between the fragment $\{\tilde{\epsilon}[k']\}$ and the bit sequence $\{a[k]\}$ can be, in some ways, quantifiably characterized by a corresponding bit-error rate (BER).

If the reflection coefficient ($\alpha_l$; also see Eq. (4)) corresponding to the defect in the SUT that caused output data signal 172 to have fragment $\{\tilde{\epsilon}[k']\}$ is relatively large, then, the reflected optical signal caused by this defect will typically be relatively strong, and the contribution of noise into the samples in sequence 164 corresponding to fragment $\{\tilde{\epsilon}[k']\}$ will typically be relatively smaller. As a result, fragment $\{\tilde{\epsilon}[k']\}$ will be expected to typically have a relatively low BER.

As another example, if the reflection coefficient corresponding to the defect in the SUT that caused output data signal 172 to have fragment $\{\tilde{\epsilon}[k']\}$ is relatively smaller, then, the reflected signal caused by this defect will typically be relatively weak, and the contribution of noise into the samples in sequence 164 corresponding to fragment $\{\tilde{\epsilon}[k']\}$ will be relatively larger. In such a case, the fragment $\{\tilde{\epsilon}[k']\}$ will be expected to typically have a relatively high BER.

The above two examples demonstrate that reflectometer 100 can probably quantifiably characterize the severity or strength of defects in the SUT, e.g., using the BER or other suitable error statistics of output data signal 172. Reflectometer 100 can typically determine the location of a defect in the SUT from the time delay of the corresponding fragment $\{\tilde{\epsilon}[k']\}$ in output data signal 172 with respect to bit sequence $\{a[k]\}$ in input data signal 102. However, due to the periodicity of input data signal 102, there might be an ambiguity regarding the precise defect location. Reflectometer 100 can be configured to resolve this ambiguity, e.g., by (i) repeating the measurement with a bit sequence $\{a[k]\}$ of a different size (N value) and/or (ii) invoking one or more known characteristics of the SUT, such as its maximum traversal time or length or the distance to a known reflector in the SUT.

Figure 3:
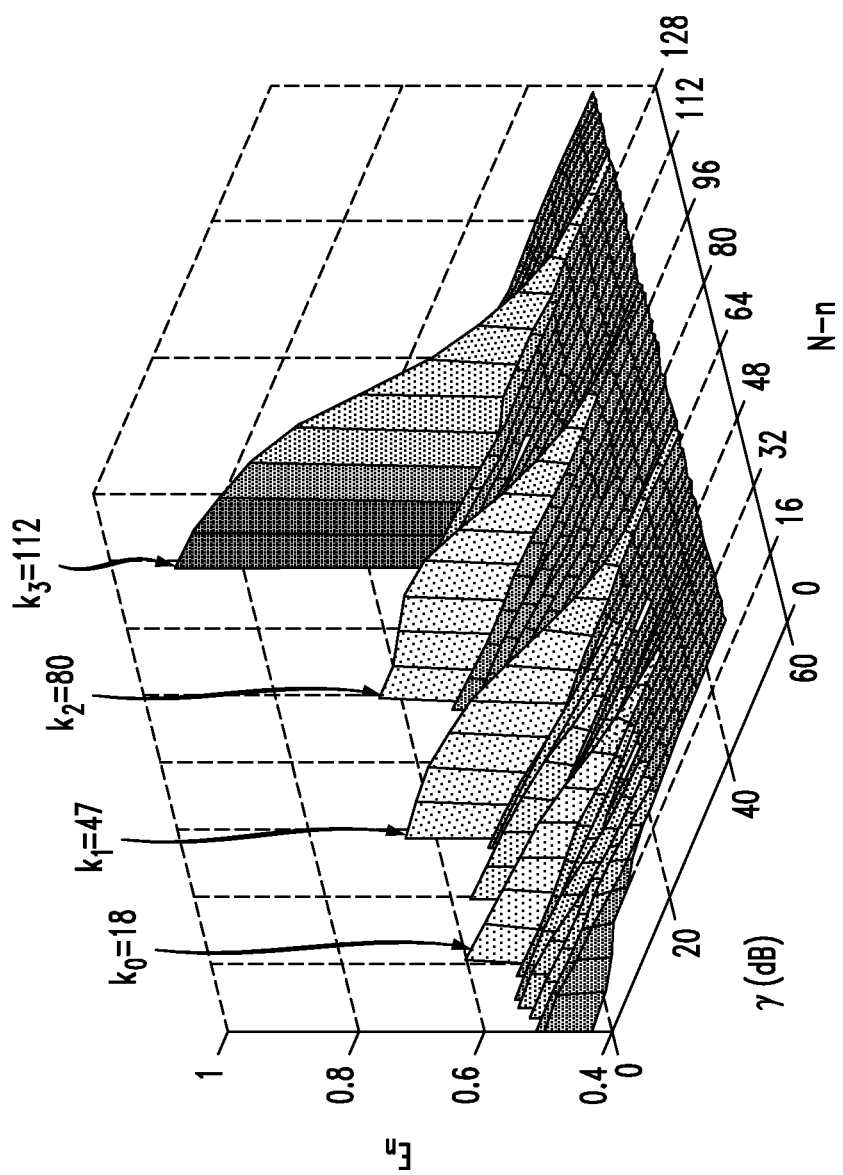
FIG. 3 graphically shows numerical-simulation results illustrating the operation of the optical TD reflectometer of FIG. 1 connected to the digital circuit of FIG. 2 according to one embodiment of the disclosure.

As further indicated below, e.g., in reference to FIG. 3, reflectometer 100 is capable of simultaneously detecting multiple defects in the SUT. However, when the SUT simultaneously has a relatively strong defect (e.g., having a relatively large value of reflection coefficient $\alpha$) and a relatively weak defect (e.g., having a relatively small value of reflection coefficient $\alpha$), manifestations of the strong defect in output data signal 172 may overwhelm manifestations of the weak defect, thereby causing the weak defect to possibly remain undetected. To address this problem, some embodiments of reflectometer 100 may incorporate noise generator 136 configured to inject a controlled amount of additional noise into sequence 164, thereby affecting the number of errors in output data signal 172. Due to the typically nonlinear relationship between the number of errors and engineering parameters (such as reflection coefficient $\alpha$) that can be used to characterize the severity of a corresponding defect in the SUT, noise generator 136 can be configurable to inject an amount of additional noise that sufficiently attenuates reflectivity manifestations of the strong defect in output data signal 172 without masking reflectivity manifestations of the relatively weak defect on that signal. As a result, both of these defects can advantageously be detected at the same time, e.g., as indicated in FIG. 3.

In an alternative embodiment, instead of being placed between transimpedance amplifier 144 and coupling capacitor 154, signal adder 150 can be placed between the transimpedance amplifier and optical detector 140. Alternatively or in addition, the level of noise in sequence 164 can be controlled, e.g., for the above-indicated purpose, by using a controllably tunable optical attenuator (not explicitly shown in FIG. 1) placed, e.g., between optical source 126 and optical circulator 130.

Eqs. (5)-(11) provide an approximate mathematical description of the transformation of photocurrent 142 (expressed above by Eq. (4)) into output data signal 172 for an embodiment of reflectometer 100 in which signal adder 150 and noise generator 136 are absent. Based on the present disclosure, one of ordinary skill in the art will understand how to modify Eqs. (5)-(11) for an embodiment of reflectometer 100 that has means for injecting additional noise into sequence 164, such as signal adder 150 and noise generator 136 shown in FIG. 1.

Electrical signal 146 (denoted as c(t)) can be approximately expressed using Eq. (5) as follows:

$$c(t) = \tilde{v}(t) + \sqrt{G} \int_{-\infty}^{\infty} q(t')b(t-t')dt' \qquad (5)$$

where $\tilde{v}(t)$ describes random noise added to the electrical signal b(t), e.g., by amplifier 144. The transimpedance amplifier 144 is represented by its power gain G, its low-pass impulse response q(t), and its internal noise $\tilde{v}(t)$. In embodiments where (i) the mean of the noise $\tilde{v}(t)$ is zero, and (ii) the noise's bandwidth $\Delta f_v$ is expressed by $$\Delta f_v = \int_0^\infty |Q(f)|^2 df,$$

where Q(f) is the Fourier transform of impulse response q(t), and (iii) the noise's variance $\sigma_v^2$ is expressed by $\sigma_v^2 = G \rho^2 \Delta f_v$, where $\rho$ is the noise equivalent power of transimpedance amplifier 144, Eq. (5) can be rewritten as Eq. (6):

$$c(t) = \tilde{v}(t) + \qquad (6)$$
$$\sqrt{G} R P_0 \sum_{l=0}^{L-1} \alpha_l \left[ (1-\eta) \int_{-\infty}^{\infty} q(t)dt + \frac{\eta}{2} \sum_{k=-\infty}^{\infty} (a[k]+1) r(t-kT-\tau_l) \right]$$

where $$r(t) = \int_{-\infty}^{\infty} q(t') p(t-t') dt'.$$

Electrical signal 156 (denoted as d(t)) can be expressed using Eq. (7) as follows:

$$d(t) = c(t) - \frac{1}{NT}\int_0^{NT} c(t)dt \quad (7)$$

where the second term involving the integral of c(t) over a time interval corresponding to a period (NT) of probe signal a(t) represents the dc component of c(t) blocked by coupling capacitor 154. In embodiments where signal sampler 160 samples d(t) at times t=k'''T, the signals corresponding to Eqs. (6) and (7), sequence 164 (denoted as d[k']) can be expressed using Eqs. (8) and (9) as follows:

$$d[k'] \beta \hat{v}[k'] + d_0[k'] \quad (8)$$

where $\hat{v}[k']=\hat{v}(k'T)$, and $d_0[k']$ is the expected mean of $d[k']$ expressed as:

$$d_0[k'] = \frac{\sqrt{G} \, RP_0 \eta}{2} \quad (9)$$

$$\sum_{l=0}^{L-1} \alpha_l \left[ \sum_{k''=-\infty}^{\infty} (a[k'-k''-k_l]+1)r(k''T-\Delta\tau_l) - \frac{2N_1}{NT}\int_{-\infty}^{\infty} r(t)dt \right]$$

where $k''=k'-k-k_l$; $\tau_l=k_l T + \Delta\tau_l$; and $$-\frac{T}{2} \leq \Delta\tau_l < \frac{T}{2}.$$

Slicer circuit 170 may generate the bit $\{\tilde{e}[k']\}$ by essentially determining the sign of $d[k']$. Recalling that the exemplary noise corresponding to $\hat{v}[k']$ is white Gaussian noise, the probabilities for $d[k']$ to be positive and negative can be expressed using Eqs. (10a) and (10b), respectively:

$$P_+[k'] = \frac{1}{2}\text{erfc}(-x_0[k']) \quad (10a)$$

$$P_-[k'] = \frac{1}{2}\text{erfc}(x_0[k']) \quad (10b)$$

where $x_0[k]$ is given by Eq. (11):

$$x_0[k'] = \frac{d_0[k']}{\sqrt{2\sigma_v^2}} = \frac{RP_0\eta}{2\rho\sqrt{2\Delta f_v}} \sum_{l=0}^{L-1} \alpha_l \quad (11)$$

$$\left[ \sum_{k''=-\infty}^{\infty} (a[k'-k''-k_l]+1)r(k''T-\Delta\tau_l) - \frac{2N_1}{NT}\int_{-\infty}^{\infty} r(t)dt \right]$$

Eq. (10a) expresses a probability that the k'-th bit in output data signal 172 is "one," i.e., the probability of $\tilde{e}[k']=1$. Eq. (10b) similarly expresses the probability that the k'-th bit in output data signal 172 is "minus one," i.e., the probability of $\tilde{e}[k']=-1$.

Figure 2:
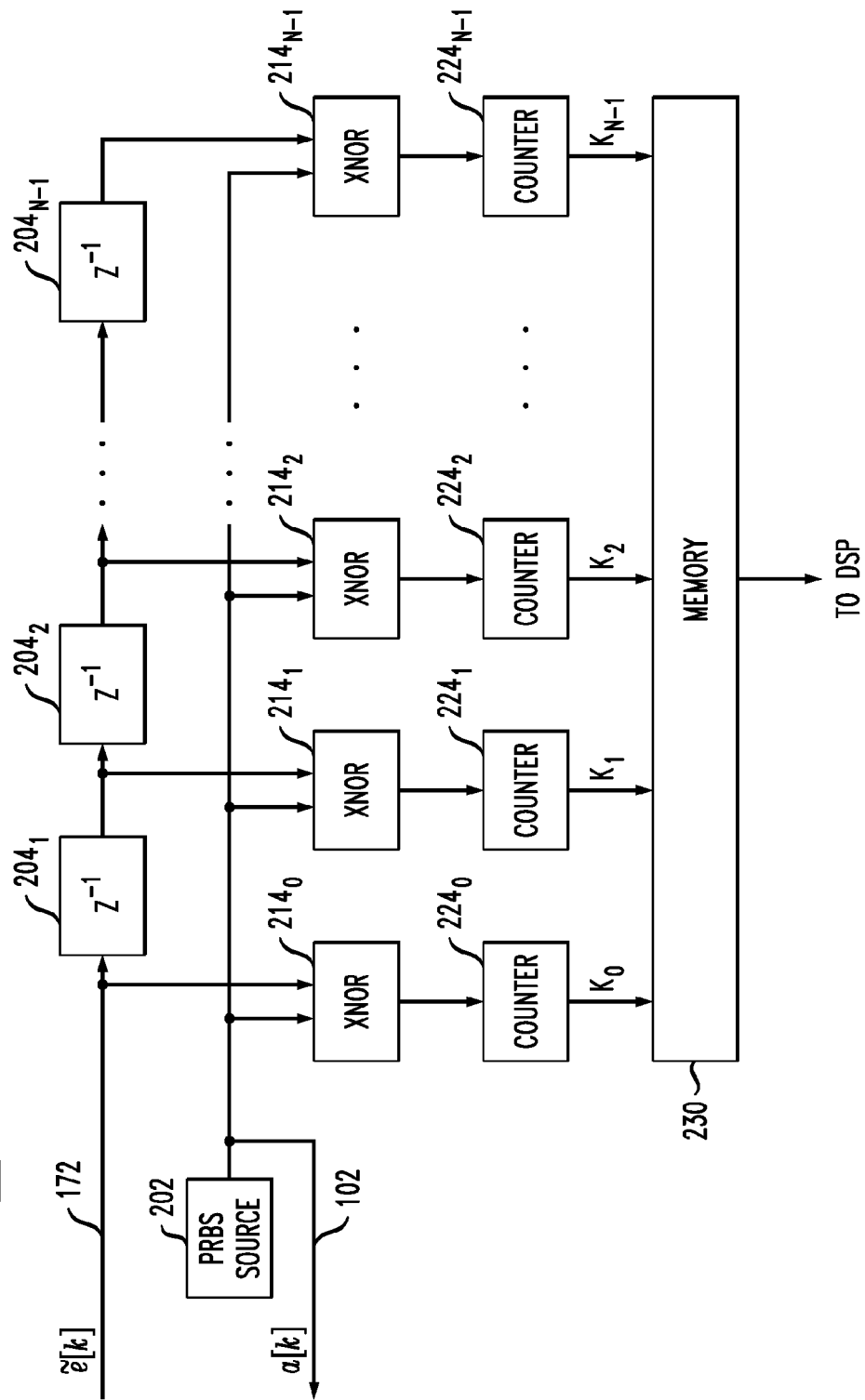
FIG. 2 shows a block diagram of a digital circuit that can be used in conjunction with the optical TD reflectometer of FIG. 1 according to one embodiment of the disclosure.

FIG. 2 shows a block diagram of a digital circuit 200 that can be used in conjunction with reflectometer 100 (FIG. 1) according to one embodiment of the disclosure. In particular, digital circuit 200 can generate input data signal 102 for reflectometer 100 as indicated in FIG. 2. Digital circuit 200 is also configured to receive and process output data signal 172 generated by reflectometer 100 as further indicated in FIG. 2.

Digital circuit 200 has a PRBS source 202 configured to generate pseudo-random bit sequence (PRBS)$_{\{a[k]\}}$, e.g., in accordance with Eqs. (1a)-(1b). Digital circuit 200 further has N−1 serially connected delay units $204_1$-$204_{N-1}$, each configured to delay the respective received signal by symbol period T. Delay unit $204_1$ is configured to receive data signal 172 from reflectometer 100 (FIG. 1). Delay units $204_2$-$204_{N-1}$ are serially connected to one another and delay unit $204_1$, with each subsequent delay unit receiving a copy of the delayed data signal 172 produced by the preceding delay unit.

Digital circuit 200 further has N XNOR gates $214_0$-$214_{N-1}$. XNOR gate $214_0$ is configured to receive (i) an un-delayed copy of data signal 172, as received from reflectometer 100, and (ii) a copy of data signal 102 generated by PRBS source 202. Each of XNOR gates $214_1$-$214_{N-1}$ is configured to receive (i) a delayed copy of data signal 172 from the corresponding one of delay units $204_1$-$204_{N-1}$ and (ii) a copy of data signal 102 generated by PRBS source 202. As known in the art, in each time slot (symbol period), an XNOR gate, such as any of XNOR gates 204, generates: (i) a binary "1", if the two input signals have the same bit value, and (ii) a binary "0", if the two input signals have different bit values.

In an alternative embodiment, the N−1 serially connected delay units $204_1$-$204_{N-1}$ can be moved and configured to serially delay data signal 102 instead of serially delaying data signal 172. In this embodiment, each of XNOR gates $214_1$-$214_{N-1}$ is configured to receive (i) an un-delayed copy of data signal 172, as received from reflectometer 100, and (ii) a respective delayed copy of data signal 102 from the output port of the respective one of the (moved) delay units $204_1$-$204_{N-1}$.

Each of XNOR gates $214_0$-$214_{N-1}$ is configured to feed a respective one of counters $224_0$-$224_{N-1}$. Each counter 214 is configured to count the number of "ones" received from the corresponding XNOR gate 214 over a fixed-length time interval that has M periods of data signal 102, i.e., a time interval that has a duration of MNT, where M is a positive integer greater than one. After each such time interval, each counter 224 saves the obtained count in a memory 230 and resets back to zero. The saved counts can then be retrieved from memory 230, e.g., for further processing in an external DSP.

Eq. (12) gives a mathematical expression for the count ($K_n$) generated by counter $224_n$:

$$K_n = \sum_{k=0}^{MN-1} \overline{a[k] \oplus \tilde{e}[k-n]} \quad (12)$$

where n=0, 1, 2, ..., N−1. For a sufficiently large M, count $K_n$ can be used to approximate expectation value $E_n$ of the cross-correlation weight between sequences $\{a[k]\}$ and $\{\tilde{e}[k-n]\}$ in accordance with Eq. (13):

$$E_n = \lim_{M\to\infty} \frac{K_n}{MN} = \frac{1}{N}\sum_{k=0}^{N-1} P_+[k-n] \quad (13)$$

where $P_+[k-n]$ can be expressed using Eqs. (10a) and (11). One of ordinary skill in the art will appreciate that a set of Eqs. (13) corresponding to the obtained set of counts $K_n$ (where n=0, 1, 2, ..., N−1) can be solved, e.g., numerically, to obtain (i) an impulse response of the SUT and/or (ii) a set of reflection coefficients $\alpha_l$ and propagation delays $\tau_l$ that characterize the severity and location, respectively, of the corresponding defects in the SUT. Therefore, the set of $K_n$ (where n=0, 1, 2, . . . , N−1) provides a measure of the impulse response of the SUT. In various embodiments, the calculations corresponding to Eqs. (10a), (11), and (13) can be carried out either in an internal DSP or in an external DSP, such as a CPU of an appropriately programmed laptop computer.

FIG. 3 graphically shows numerical-simulation results illustrating the operation of reflectometer 100 (FIG. 1) and digital circuit 200 (FIG. 2) according to one embodiment of the disclosure. The results of FIG. 3 correspond to: (i) bit sequence {a[k]} of length N=128, with 64 "ones" and 64 "minus ones;" (ii) rectangular optical-pulse envelope p(t); (iii) transimpedance amplifier 144 having a rectangular impulse response; and (iv) the following miscellaneous parameters: peak power $P_0$=1 mW, light-to-current conversion coefficient R=1 A/W, intensity-modulation index $\eta$=1, noise equivalent power $\rho$=1 pA/Hz$^{0.5}$, and noise bandwidth $\Delta f_v$=20 MHz. The SUT has four defects (i.e., L=4), with locations corresponding to the $k_l$ values of 18, 47, 80, and 112, respectively. The level (e.g., the power and variance) of the additional noise injected by noise generator 136 is quantified by parameter $\gamma$, which can vary between 0 and 60 dB.

The vertical axis in FIG. 3 represents the values of cross-correlation weights $E_n$ (also see Eq. (13)). The two axes in the base plane of FIG. 3 represent the values of N-n and parameter $\gamma$, respectively. During a single measurement, the configuration of noise generator 136 typically remains fixed, which means that a representative measurement result obtained with reflectometer 100 and circuit 200 may be given by a cross-section of the data shown in FIG. 3 by a plane that is orthogonal to the $\gamma$ axis. Inspection of such a cross-section reveals that $E_n$ has well-pronounced peaks at N-n values of 18, 47, 80, and 112, which means that all four defects can be detected at the same time, in a single measurement. The smaller additional peaks, such as the one located at about N−n=32, might represent optical signals corresponding to multiple light reflections between the various defects and/or be artifacts of signal processing, e.g., caused by small correlation in the excitation pattern.

At $\gamma$=0 (i.e., no additional noise from noise generator 136), the peak located at N−n=112 is significantly larger than the other peaks. As already indicated above, in certain situations, e.g., with a relatively small distance between two adjacent defects, a relatively strong peak can overwhelm a smaller peak. This problem can be addressed, e.g., by changing the value of $\gamma$ from 0 to about 20 dB by appropriately configuring noise generator 136. As can be seen in FIG. 3, at $\gamma$=20 dB, the amplitude of the peak located at N−n=112 is significantly decreased, while the amplitude of the peak located at N−n=80 is slightly increased. Thus, noise generator 136 can advantageously be used to optimize the conditions for detecting multiple defects of different strength at the same time.

While the inventions have been described with reference to illustrative embodiments, this description is not intended to be construed in a limiting sense.

Although certain embodiments of the invention have been described in reference to optical reflectometer 100 (FIG. 1), embodiments of the disclosure are not so limited. From the provided description, one of ordinary skill in the art will be able to make and use similarly functioning radio-frequency reflectometers and acoustic reflectometers. For example, some changes to the reflectometer structure shown in FIG. 1 may relate to the interface between the reflectometer and the SUT. For example, a radio-frequency reflectometer can be constructed by replacing optical source 126 by an RF-frequency generator and RF antenna or an RF-signal coupler, and replacing optical detector 140 by an appropriate RF receiver (see FIG. 1). The RF-signal coupler can be used for both transmitting an RF probe signal 128 to an RF SUT (e.g., a coaxial cable) and receiving an RF response signal 138 from said SUT. An acoustic reflectometer can be constructed, e.g., by replacing optical source 126 by a speaker, and replacing optical detector 140 by a microphone.

Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

What is claimed is:

1. An apparatus comprising:
a transmitter configured to generate a modulated probe signal including a first sequence of digital symbols corresponding to a first bit sequence and to apply said modulated probe signal to a system under test;
a receiver configured to receive a reflected signal corresponding to the modulated probe signal back from the system under test and to convert the reflected signal into a second bit sequence, wherein the receiver comprises a slicer circuit configured to compare a signal sample corresponding to the reflected signal with a threshold level and to generate a respective bit of the second bit sequence based on said comparison;
a digital circuit configured to compare the first bit sequence with each of a plurality of variously delayed copies of the second bit sequence to generate a measure of an impulse response of the system under test; and
a digital processor configured to process the measure to determine whether one or more defects exist in the system under test, wherein, if the digital processor detects a defect in the system under test, then the digital processor is configured to process the measure to determine a reflection coefficient corresponding to the defect and a travel time of the probe signal to the defect.

2. The apparatus of claim 1, wherein the slicer circuit is a single-bit analog-to-digital converter.

3. The apparatus of claim 1, wherein the apparatus is configured to generate the first and second bit sequences so that:
the first bit sequence is periodic, wherein each period has a plurality of time slots, with each time slot having a respective single bit of the first bit sequence; and
the second bit sequence has a plurality of time slots, with each time slot having a respective single bit of the second bit sequence.

4. The apparatus of claim 3, wherein the first sequence of digital symbols is the first bit sequence.

5. The apparatus of claim 1, wherein the second bit sequence represents an impulse response of the system under test.

6. The apparatus of claim 1, wherein the transmitter comprises:
an optical source configured to generate the modulated probe signal, wherein the modulated probe signal is an intensity-modulated optical signal; and
a drive circuit configured to drive the optical source based on the first bit sequence having first and second binary values in a manner that causes the optical source to generate an optical pulse for the intensity-modulated optical signal in response to each first binary value in the first bit sequence, and not to generate an optical pulse for the intensity-modulated optical signal in response to each second binary value in the first bit sequence.

7. The apparatus of claim 6, wherein:
the reflected signal is an optical signal; and
the receiver further comprises:
an optical detector configured to convert the received reflected signal into a corresponding first electrical signal;
an amplifier configured to convert the first electrical signal into an amplified electrical signal;
a coupling capacitor configured to block a dc component of the amplified electrical signal to generate a second electrical signal; and
a signal sampler configured to sample the second electrical signal to generate the signal samples for the slicer circuit.

8. The apparatus of claim 1, further comprising:
a noise generator configured to inject noise into the second bit sequence; and
a controller configured to control a level of the noise injected by the noise generator.

9. The apparatus of claim 1, wherein the digital circuit comprises:
a series of delay elements configured to incrementally delay the second bit sequence with respect to the first bit sequence to generate the plurality of the variously delayed copies of the second bit sequence;
a plurality of XNOR gates, each configured to receive (i) a respective copy of the first bit sequence and (ii) a respective one of the plurality of the variously delayed copies of the second bit sequence from a respective one of the delay elements;
a plurality of counters, each coupled to an output of a respective one of the plurality of the XNOR gates and configured to count a number of first binary values generated by the XNOR gate over a fixed time interval, wherein a set of said counted numbers generated by the plurality of said counters is a measure of the impulse response of the system under test.

10. The apparatus of claim 9, wherein the fixed time interval has a duration that is an integer multiple of a period of the first bit sequence.

11. The apparatus of claim 1, further comprising a memory configured to store the generated measure.

12. The apparatus of claim 11, wherein the digital processor is configured to retrieve the measure from the memory and to process the retrieved measure to determine whether the one or more defects exist in the system under test.

13. The apparatus of claim 12, wherein, if the digital processor detects first and second defects in the system under test, then the digital processor is configured to process the retrieved measure to determine a respective reflection coefficient corresponding to each of the first and second defects and a respective travel time of the probe signal to each of the first and second defects.

14. The apparatus of claim 1, wherein the apparatus comprises an optical reflectometer, wherein:
   the transmitter is an optical transmitter configured to generate the modulated probe signal so that it is an optical signal; and
   the receiver is an optical receiver configured to receive a reflected optical signal corresponding to the optical modulated probe signal generated by the optical transmitter.

15. The apparatus of claim 1, wherein the apparatus comprises an electrical radio-frequency reflectometer, wherein:
   the transmitter is an electrical radio-frequency transmitter configured to generate the modulated probe signal so that it is an electrical signal; and
   the receiver is an electrical radio-frequency receiver configured to receive a reflected electrical radio-frequency signal corresponding to the electrical radio-frequency modulated probe signal generated by the electrical radio-frequency transmitter.

16. The apparatus of claim 1, wherein the apparatus comprises an acoustic reflectometer, wherein:
   the transmitter comprises an acoustic transducer configured to generate the modulated probe signal so that it is an acoustic signal; and
   the receiver comprises an acoustic microphone configured to receive a reflected acoustic signal corresponding to the acoustic modulated probe signal generated by the acoustic transducer.

17. An apparatus comprising:
   a transmitter configured to generate a modulated probe signal including a first sequence of digital symbols corresponding to a first bit sequence and to apply said modulated probe signal to a system under test; and
   a receiver configured to receive a reflected signal corresponding to the modulated probe signal back from the system under test and to convert the reflected signal into a second bit sequence, wherein the receiver comprises a slicer circuit configured to compare a signal sample corresponding to the reflected signal with a threshold level and to generate a respective bit of the second bit sequence based on said comparison; and
   wherein the transmitter comprises:
      an optical source configured to generate the modulated probe signal, wherein the modulated probe signal is an intensity-modulated optical signal; and
      a drive circuit configured to drive the optical source based on the first bit sequence having first and second binary values in a manner that causes the optical source to generate an optical pulse for the intensity-modulated optical signal in response to each first binary value in the first bit sequence, and not to generate an optical pulse for the intensity-modulated optical signal in response to each second binary value in the first bit sequence;
   wherein the reflected signal is an optical signal; and
   wherein the receiver further comprises:
      an optical detector configured to convert the received reflected signal into a corresponding first electrical signal;
      an amplifier configured to convert the first electrical signal into an amplified electrical signal;
      a coupling capacitor configured to block a dc component of the amplified electrical signal to generate a second electrical signal; and
      a signal sampler configured to sample the second electrical signal to generate the signal samples for the slicer circuit.

18. An apparatus comprising:
   a transmitter configured to generate a modulated probe signal including a first sequence of digital symbols corresponding to a first bit sequence and to apply said modulated probe signal to a system under test;
   a receiver configured to receive a reflected signal corresponding to the modulated probe signal back from the system under test and to convert the reflected signal into a second bit sequence, wherein the receiver comprises a slicer circuit configured to compare a signal sample corresponding to the reflected signal with a threshold level and to generate a respective bit of the second bit sequence based on said comparison; and
   a digital circuit that comprises:
      a series of delay elements configured to incrementally delay the first bit sequence with respect to the second bit sequence to generate a plurality of the variously delayed copies of the first bit sequence;
      a plurality of XNOR gates, each configured to receive (i) a respective copy of the second bit sequence and (ii) a respective one of the plurality of the variously delayed copies of the first bit sequence from a respective one of the delay elements;
      a plurality of counters, each coupled to an output of a respective one of the plurality of the XNOR gates and configured to count a number of first binary values generated by the XNOR gate over a fixed time interval, wherein a set of said counted numbers generated by the plurality of said counters is a measure of the impulse response of the system under test.

\* \* \* \* \*